UNITED STATES PATENT OFFICE.

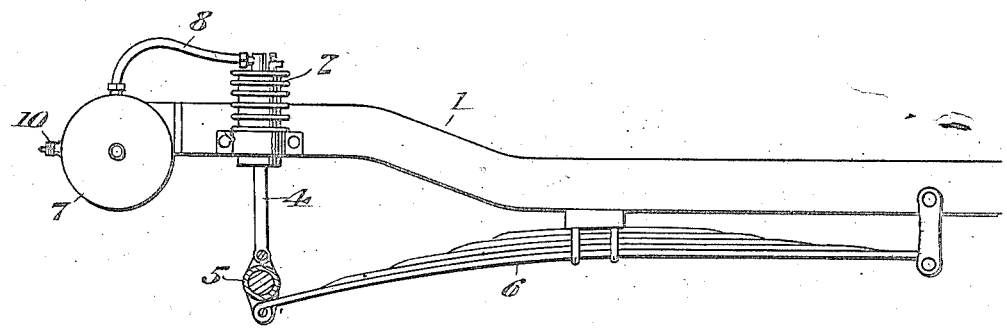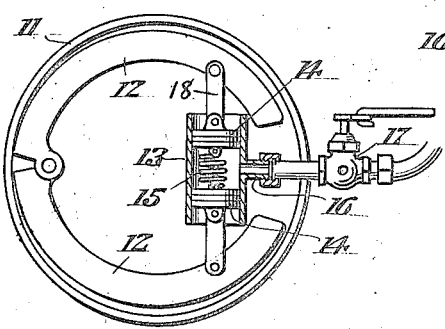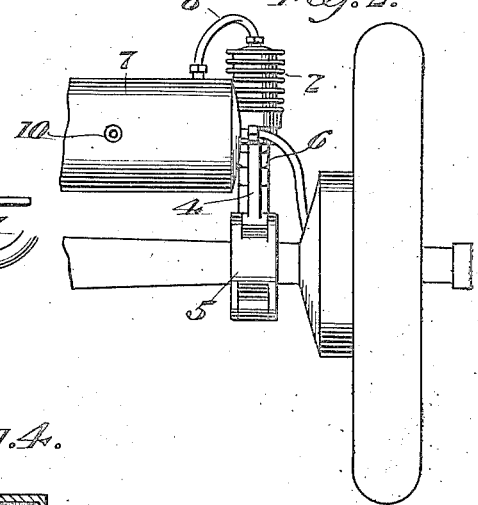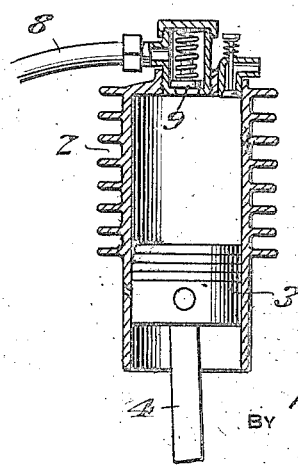

EDWARD S. BOCK, OF ELLINWOOD, KANSAS.

AIR-BRAKE MECHANISM.

1,253,130.  Specification of Letters Patent.  Patented Jan. 8, 1918.

Application filed May 26, 1917. Serial No. 171,191.

*To all whom it may concern:*

Be it known that I, EDWARD S. BOCK, a citizen of the United States, residing at Ellinwood, in the county of Barton and State of Kansas, have invented new and useful Improvements in Air-Brake Mechanism, of which the following is a specification.

This invention relates to air brake mechanisms adapted to be used upon automobile machines and it consists in the novel features hereinafter described and claimed.

An object of the invention is to provide an air pump mechanism adapted to be applied as stated which serves as means for applying the brakes thereof and also combined features which serve as means for cushioning the shock of the machine and thereby cause the machine to pass smoothly over rough spots or depressions in the roadway.

To these ends the invention includes a cylinder which is mounted upon the frame of the machine and having a piston movably mounted therein. A collar is mounted upon the axle of the machine and is operatively connected with the piston. The said collar is further connected with the spring of the machine. A tank is mounted upon the frame and a pipe connects the cylinder with the tank. A spring pressed check valve is located at the top end of the cylinder and prevents the air from returning from the tank to the cylinder. Connections may be provided at the tank for conducting the compressed air to the tires of the machine or to the brake mechanism as hereinafter described.

In the accompanying drawings:—

Figure 1 is a fragmentary side elevation of the frame of an automobile machine showing the combined air pump and shock absorber applied;

Fig. 2 is a rear view of the same;

Fig. 3 is a fragmentary side elevation of the same with parts in section;

Fig. 4 is a detail sectional view of a cylinder used in the shock absorber.

As illustrated in the accompanying drawing, the frame of the automobile machine is indicated at 1 and a cylinder 2 is mounted thereon. The said cylinder is surrounded by flanges or ridges of conventional form whereby the cylinder is of that type generally known as an air cooled cylinder. A piston 3 is slidably mounted in the cylinder 2 and a rod 4 is pivotally connected at one end with the said piston. The other end of the said rod 4 is pivotally connected with a collar 5 which is loosely mounted upon the axle of the automobile machine. A spring 6 is connected at its intermediate portion and at one end with the frame 1 and the other end of the said spring is pivotally connected with the collar 5. As the automobile machine travels over a roadway the spring 6 may flex and the frame 1 may move vertically with relation to the axle upon which the collar 5 is mounted.

A tank 7 is mounted upon the frame 1 and a pipe 8 connects the upper end of the cylinder 2 with the said tank 7. A spring pressed valve 9 is located within the pipe 8 and mounted at the upper end of the cylinder 2 and serves as means for preventing air from returning from the tank 7 to the interior of the cylinder 2. The tank 7 is provided with a valve controlled nipple 10 to which a rubber hose may be connected for the purpose of conducting air from the tank to the tires of the automobile machine for the purpose of inflating the same.

A drum 11 may be attached to one of the driving wheels of the automobile machine and brake shoes 12 are pivotally connected together and mounted within the said drum 11. A cylinder 13 is located between the free end portions of the shoes 12 and pistons 14 are slidably mounted in the said cylinder 13. A spring 15 is connected with the pistons 14 and is under tension with a tendency to draw the pistons toward each other. The cylinder 13 is provided at its sides with a nipple 16 and a pipe may be connected with the said nipple and the tank 7 hereinbefore described. The pipe is also provided with a valve indicated at 17 and may be manipulated to permit air to flow from the tank to the cylinder 13 whereby the pistons 14 are spread with relation to each other by the introduction of air from the tank into the cylinder 13. Links 18 are pivotally connected at one end with the pistons 14 and pivotally connected at their other ends with the free end portions of the shoes 12. Consequently it will be seen that when air is admitted into the cylinder 13 the pistons are moved away from each other and the links 18 are moved longitudinally whereby the shoes 12 are swung and forced into frictional contact with the drum 11 and serve as means for preventing the rotation of the wheel to which the said drum is applied.

During the travel of the automobile machine the frame 1 moves vertically with relation to the axle upon which the collar 5 is mounted and hence the rod 4 is moved longitudinally and the piston 3 is reciprocated in the cylinder 2. Thus air is compressed in the cylinder 2 and forced by the valve 9 and through the pipe 8 into the tank 7.

From the foregoing description taken in conjunction with the accompanying drawing, it will be seen that a combined brake, air pump and shock absorber of simple and durable structure is provided, and that the same may be used to advantage upon an automobile machine whereby the body of the vehicle is carried evenly and at the same time has all of the advantages of the resiliency of the springs which support the same. The return or recoil incident to such springs is overcome so that danger of breaking is obviated and the objectional throw of such eliminated.

Having described the invention what is claimed is:—

In combination with an air pump and tank adapted to be applied to the frame of a machine, a drum adapted to be connected with the wheel of the machine, shoes pivotally mounted within the drum, a cylinder located within the drum, said cylinder being open at its ends, means for leading air from the tank to the last mentioned cylinder at a point between the ends thereof, pistons movably mounted in the last mentioned cylinder, a spring located between and connected with the said pistons and being under tendency to draw the same toward each other, and links pivotally connected with the said pistons and pivotally connected with the said shoes.

In testimony whereof I affix my signature.

EDWARD S. BOCK.